(12) United States Patent
Desberg

(10) Patent No.: US 9,375,647 B2
(45) Date of Patent: Jun. 28, 2016

(54) KART WITH MOVABLE VISUAL EFFECT

(71) Applicant: RAZOR USA LLC, Cerritos, CA (US)

(72) Inventor: Ian Desberg, Cerritos, CA (US)

(73) Assignee: Razor USA LLC, Cerritos, CA (US)

(*) Notice: Subject to any disclaimer, the term of this patent is extended or adjusted under 35 U.S.C. 154(b) by 0 days.

(21) Appl. No.: 14/823,737

(22) Filed: Aug. 11, 2015

(65) Prior Publication Data

US 2016/0129356 A1    May 12, 2016

Related U.S. Application Data

(63) Continuation of application No. 14/067,818, filed on Oct. 30, 2013, now Pat. No. 9,132,359.

(51) Int. Cl.
| | | |
|---|---|---|
| A63C 9/00 | (2012.01) | |
| A63H 17/26 | (2006.01) | |
| A63H 17/38 | (2006.01) | |

(52) U.S. Cl.
CPC ................. *A63H 17/26* (2013.01); *A63H 17/38* (2013.01); *A63C 9/00* (2013.01)

(58) Field of Classification Search
CPC .......... B60B 7/08; A61G 5/08; A61G 5/1059; B60N 2/2854; A63C 9/00
See application file for complete search history.

(56) References Cited

U.S. PATENT DOCUMENTS

| | | | | |
|---|---|---|---|---|
| 4,264,080 A | * | 4/1981 | Kassai | ..................... B62K 9/00 280/1.13 |
| 4,759,557 A | * | 7/1988 | Kassai | ................... A63G 19/18 280/1.14 |

\* cited by examiner

*Primary Examiner* — John Walters
*Assistant Examiner* — James Triggs
(74) *Attorney, Agent, or Firm* — Knobbe, Martens, Olson & Bear LLP

(57) ABSTRACT

A ridable kart having a front portion rotatably coupled to a rear portion. The front portion includes an inner surface that is adjacent to an outer cover portion and the two surfaces move relative to one another. The outer cover portion includes window portions or openings through which a portion of the inner surface is visible. The inner surface includes a visual feature that is visible through the window portions and the visual features moves relative to the window portions when the front portion rotates relative to the rear portion.

20 Claims, 4 Drawing Sheets

KART WITH MOVABLE VISUAL EFFECT

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety.

BACKGROUND OF THE DISCLOSURE

1. Field of the Invention

Embodiments of the invention relate generally to ridable vehicles and, more specifically, to a ridable kart with a movable visual effect.

2. Description of the Related Art

Riding on vehicles such as go karts or toy karts is a popular recreational activity. Karts have become popular among many age groups and there are many different kart variations and designs. Conventional karts generally have at least three wheels and some type of steering mechanism. Other kart designs include four or more wheels. Kart designs have also become more compact and convenient. With the increase in kart popularity, there has also been a significant increase in the demand for karts of varying sizes. There has also been an increase in the demand for karts with visual features and accessories that personalize the kart.

Often, it is desirable for a smaller rider to ride a kart without the use of a motor or power unit. However, some karts without motors require a rider to use his or her feet to push on the riding surface and propel the kart. Also, it is desirable that some karts have a visual element or design, especially those karts intended for use by children. Such karts might include a movable visual element that a rider must directly move with his or her feet or hands.

SUMMARY OF THE INVENTION

An aspect of one or more embodiments involves the realization that it is desirable to allow a smaller rider to ride on a kart and move the kart without the use of a motor or the rider pushing off the riding surface. Another aspect of one or more embodiments is that it is desirable to have a movable visual effect on a kart that does not require a rider to use his or her hands or feet to directly move the movable visual feature. Therefore, the current arrangements in the prior art for ridable vehicles or karts are unsuitable or could be improved or made more desirable.

Preferred embodiments of a kart have a first portion and a second portion that are movable relative to one another. One of the first portion and the second portion have a visual feature that is movable along with one of the first portion and the second portion and is externally visible in at least some relative positions of the first portion and the second portion. In some configurations, movement of the first portion relative to the second portion is directed by the user of the kart and can be or include steering movement of the kart. In some configurations, the visual feature is carried by an inner portion of the kart and is visible through windows or openings in an outer portion of the kart.

Some embodiments of the present kart are configured to provide a moving visual effect as a user rides on the kart. A user can ride on the kart and steer the kart while at the same time producing the desired visual effect. Furthermore, preferred embodiments allow the user to generate the visual effect by moving one portion of the kart relative to another portion. Furthermore, preferred embodiments are configured so that the user does not need to remove his or her hands or feet from their normal riding positions in order to produce the visual effect. Preferably, an inner portion of the kart moves relative to an outer portion of the kart and at least a portion of the inner portion can be seen through the outer portion as the inner portion moves relative to the outer portion.

A preferred embodiment is a ridable vehicle or kart. The kart includes a body having a rear portion with a seat portion and an outer cover portion. The rear portion supports at least one rear wheel. The kart body also includes a front portion having a coupling portion rotatably coupled to the rear portion. The front portion includes a handlebar assembly operably coupled to the front portion. The front portion also supports at least one front wheel and includes an inner surface. The inner surface is positioned adjacent to the outer cover portion and the outer cover portion covers at least a portion of the inner surface. The outer cover portion includes at least one window portion through which a portion of the inner surface is visible. Preferably, the inner surface includes at least one visual feature visible through the at least one window portion, and the visual feature moves relative to the window portion as the front portion rotates relative to the rear portion.

In some configurations, the front portion rotates relative to the rear portion about an axis, and the inner surface rotates relative to the outer portion about the axis.

In some configurations, the outer cover portion includes two window portions and the inner surface includes two visual features, and the two visual features resemble eyes. In some configurations, the two visual features move relative to the window portions along a curved path as the front portion rotates relative to the rear portion.

In some configurations, the handlebar assembly includes substantially straight portions configured to support the foot of a user riding the kart.

In some configurations, the outer cover portion is curved and the inner surface is similarly curved so that the inner surface can slide along the inside of the outer cover portion.

An embodiment involves a ridable vehicle with a body having a rear portion rotatably coupled to a front portion. The front portion includes a coupling portion and the rear portion includes a seat portion. The vehicle includes at least one front wheel supported by the front portion and at least one rear wheel supported by the rear portion. It also includes a handlebar assembly supported by the front portion and accessible to a user riding the vehicle. The rear portion has an outer shell portion having at least one opening and the front portion has an inner surface adjacent to the outer shell portion. The inner surface moves relative to the outer shell portion when the front portion is rotated relative to the rear portion. The outer shell portion includes a curved surface and the inner surface includes a curved surface so that the inner surface can slide along the inside of the outer shell portion. The inner surface has a visual feature that is visible through the opening in the outer shell portion and the visual feature moves relative to the opening.

In some configurations, the front portion rotates relative to the rear portion about an axis, and the inner surface rotates relative to the outer portion about the axis. In some configurations, the outer shell portion includes two openings and the inner surface includes two visual features, and the two visual features resemble eyes.

In some configurations, the two visual features move relative to the two openings along a curved path. In some configurations, the handlebar assembly includes substantially straight portions configured to support the foot of a user riding the kart.

In some configurations, the at least one front wheel is positioned underneath the rear portion.

BRIEF DESCRIPTION OF THE DRAWINGS

These and other features, aspects, and advantages of the present invention are described below with reference to drawings of a preferred embodiment, which is intended to illustrate, but not to limit, the present invention. The drawings contain six figures.

DETAILED DESCRIPTION OF THE PREFERRED EMBODIMENTS

In the following detailed description, terms of orientation such as "top", "bottom", "upward", "downward", "lower", "front", "frontward", "rear", "rearward", and "end" are used to simplify the description of the context of the illustrated embodiments. Likewise, terms of sequence, such as "first" and "second", are used to simplify the description of the illustrated embodiments. However, other orientation and sequences are possible, and the present invention should not be limited to the illustrated orientation(s). Those skilled in the art will appreciate that other orientations of the various components are possible.

For the purposes of this disclosure, embodiments of personal mobility vehicles will be referred to as "karts", but it will be understood by those with ordinary skill in the art that the present invention extends beyond the specifically disclosed embodiments and references to karts to other alternative embodiments and/or uses of the invention and modifications and equivalents thereof. In particular, while the present vehicles and related methods have been described in the context of particularly preferred embodiments as it relates to karts, the skilled artisan will appreciate, in view of the present disclosure, that certain advantages, features and aspects of the systems and methods may be realized in a variety of other applications, including personal mobility vehicles other than karts with different arrangements of front and rear wheels.

In a preferred embodiment, a kart includes a body having a rear portion and a front portion. Preferably, the front portion is rotatably coupled to the rear portion and is movable relative to the rear portion. The rear portion of the body includes a seat portion and an outer shell or cover portion. Preferably, the front portion includes a coupling portion coupled to the rear portion and an inner surface adjacent the outer shell or cover portion of the rear portion. In some embodiments, the inner surface moves relative to the outer shell, and the outer shell includes an opening or window through which a portion of the inner surface is visible. Preferably, the inner surface includes some type of visual marking or effect that moves relative to the outer shell and is visible through the opening or window in the outer shell. In some embodiments, the openings or windows on the outer shell are shaped like eyes and the inner surface includes markings that look like eye balls and move relative to the windows to give the effect of eyes moving to look in different directions. Embodiments of the kart are described below with reference to FIGS. 1 through 6. In the illustrated arrangements, the kart includes a front portion with an inner surface and a rear portion having an outer shell or cover portion, however, arrangements in which the illustrated arrangement is reversed or in which the kart has other portions or surface that move relative to one another are also possible.

Figure 1:
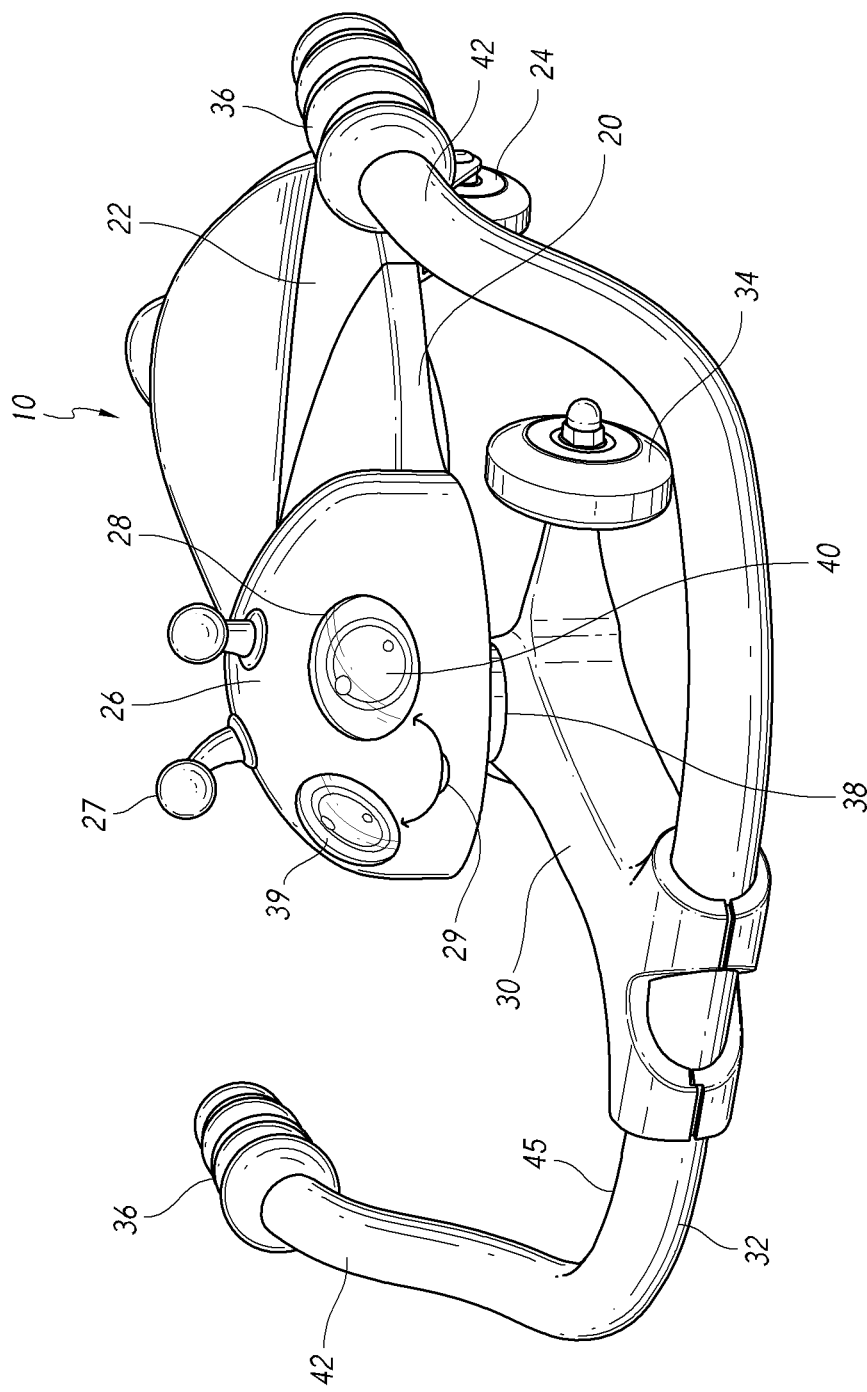
FIG. 1 is a perspective view of an embodiment of a kart having certain features, aspects, and advantages of the present invention.
Figure 2:
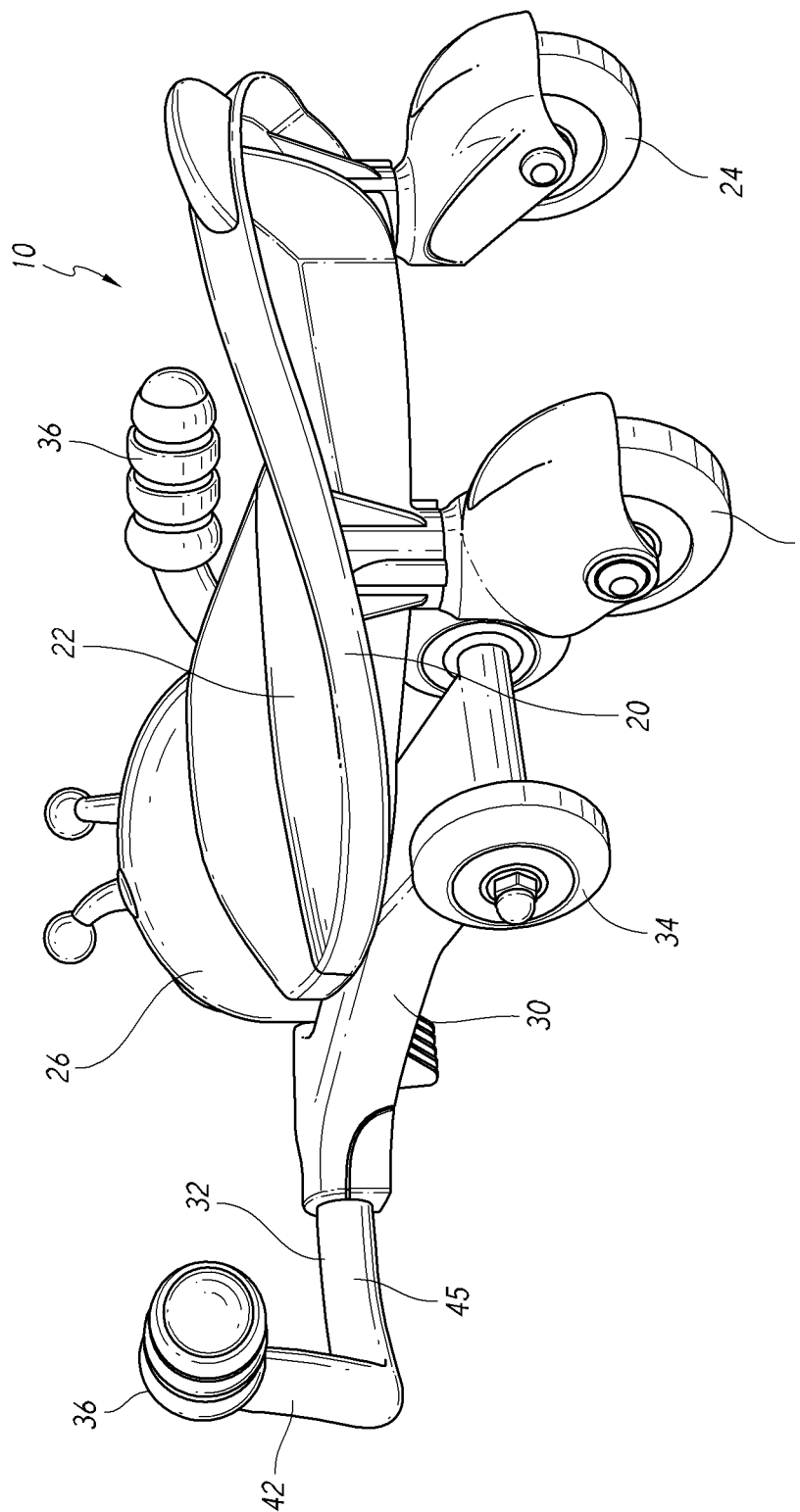
FIG. 2 is another perspective view of the kart of FIG. 1.
Figure 3:
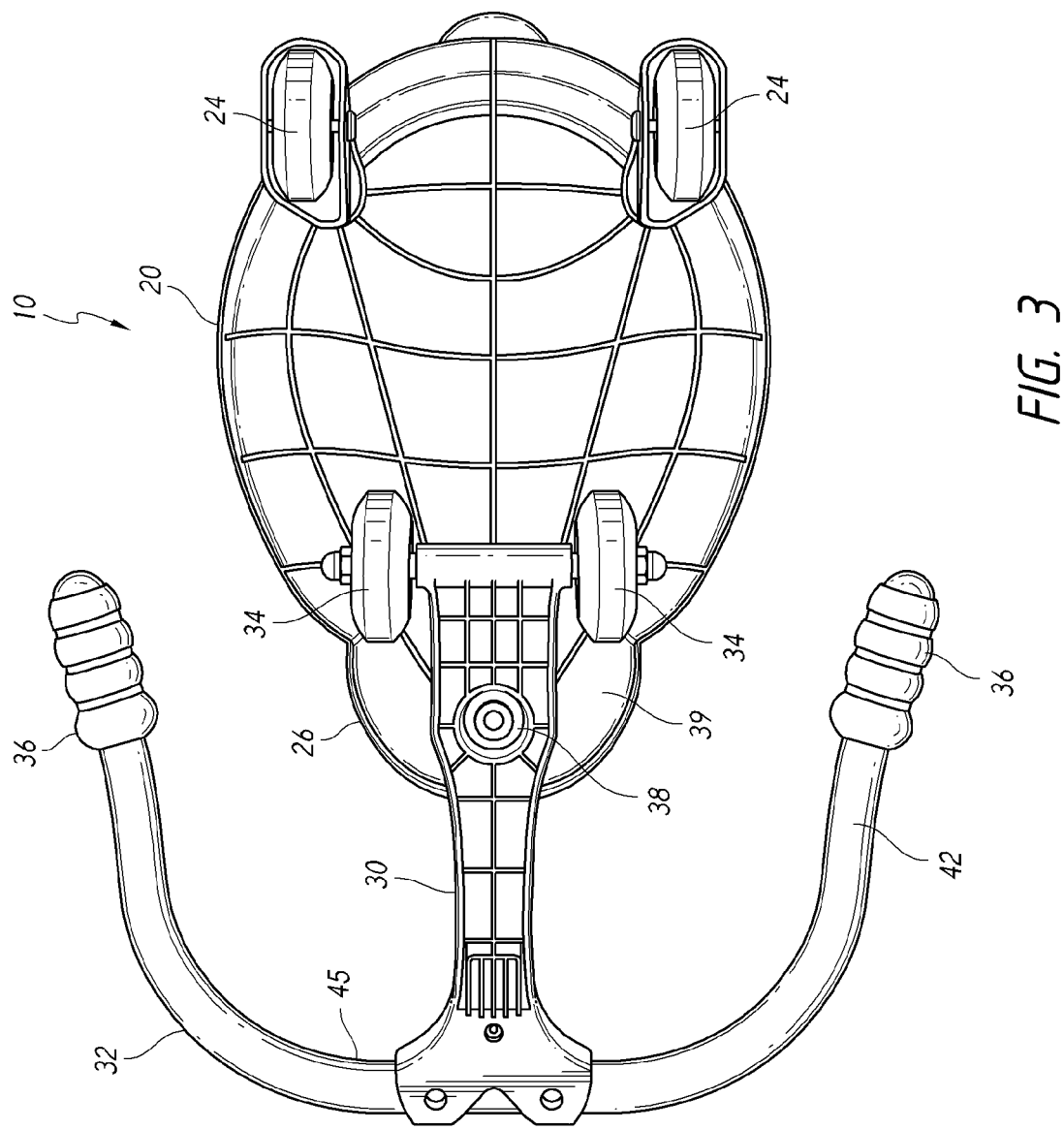
FIG. 3 is a bottom view of a kart of FIG. 1.

FIG. 1 illustrates a kart having certain features, aspects and advantages of the present invention. The kart includes a body 10, which includes a first or rear portion 20 and a second or front portion 30. Preferably the front portion 30 is rotatably coupled to the rear portion 20. The rear portion 20 includes a seat portion 22 configured to allow a rider to be seated thereon. The rear portion 20 also supports at least one rear wheel 24. In a preferred embodiment, the rear portion 20 supports two rear wheels 24 and in other embodiments the rear portion 20 can support more than two rear wheels. The rear wheels 24 are coupled to the bottom of the rear portion 20. In some embodiments, the rear wheels 24 are swivel or caster wheels configured to rotate relative to the rear portion 20 about a swivel axis. Preferably, the rear wheels 24 are located below and toward a rearward end of or behind the seat portion 22. In some embodiments, the rear portion 20 curves upward or extends upward at the rear end of the rear portion behind the seat portion 22. Preferably, the rear portion 20 also includes an outer shell or cover portion 26. In some embodiments, the outer shell or cover portion 26 is located in front of and adjacent to the seat portion 22 and can resemble a head of an animal, insect or character, for example.

As illustrated, the outer cover portion 26 preferably includes one or more openings or window portions 28. In some embodiments, the one or more openings or window portions 28 are configured to allow a person to see through the outer cover 26. In one embodiment, the window portions 28 comprise a translucent or transparent material. In another embodiment, the window portions 28 comprise cut-out portions in the outer cover portion 26. Preferably, the window portions 28 are circular and are located near the front of the outer shell or cover 26. The outer shell 26 can also include visual features on the surface of outer shell 26 or extending therefrom. For example, the outer shell 26 can include protruding features such as protrusions resembling antennae 27 or features painted or printed on the surface such as features resembling a mouth 29 or ears. In some embodiments, the outer shell 26 is configured with visual features that resemble an animal, insect or cartoon character.

As illustrated, the front portion 30 includes a coupling portion 38 that is configured to be coupled to the rear portion 20. The front portion 30 also supports at least one front wheel 34. In a preferred embodiment, the front portion 30 supports two front wheels 34 and in other preferred embodiments, the front portion 30 supports only one front wheel or more than two front wheels 34. Preferably, the front portion 30 also supports a handlebar assembly 32 configured to allow a user to move and/or steer the kart. The handlebar assembly 32 preferably extends from the front of the kart backwards toward the rear portion 20 so that a user can access the handlebar assembly 32 with his or her hands. The handlebar assembly 32 also preferably includes grips 36 accessible to the hands of a user. Preferably, the front portion 30 in configured to extend away from the rear portion 40 in the forward direction and the handlebar assembly 32 is supported by the front portion 30 at a location forward from the rear portion 20 so that a user riding the kart can rest his feet on a portion of the handlebar assembly 32 in front of the rear portion 20. In some embodiments, the handlebar assembly 32 includes a substantially straight portion or portions 45 located near the front of the kart and configured to support a user's foot as the user rides the kart. Preferably, the handlebar assembly 32 also includes two end portions 42 that extend backward toward the rear portion 20 of the kart. Preferably, the end portions 42 also curve or extend upward and include the grips 36 that are accessible to a user riding the kart.

In some preferred embodiments, the front portion 30 is rotatably coupled to the rear portion 20 and rotates relative to the rear portion 20 about an axis. Preferably the axis is generally or substantially vertical and/or normal to the riding surface. Preferably, the front wheels 34 are positioned behind the axis and under the rear portion 20. Preferably, the entire front portion 30, including the handlebar assembly 32 and the front wheels 34, rotate about the axis relative to the rear portion 20. Each of the front wheels 34 can also rotate about its own wheel axis. Because the rotational axis and/or contact patch of the front wheels 34 is spaced behind the steering axis, oscillating movement or repeated back-and-forth rotation of the front portion 30 also creates a motive force for the kart. In some embodiments, the front wheels 34 can be swivel or caster wheels that are configured to rotate about a swivel axis relative to the front portion.

As illustrated, the front portion 30 also includes an inner member or inner surface portion 39. Preferably, the inner surface portion 39 moves relative to the outer shell or cover 26 of the rear portion 20 as the front portion 30 rotates relative to the rear portion 20. The inner surface 39 is at least partially nested within or covered by the outer cover portion 26 and the inner surface 39 preferably has the same, similar or compatible shape as part of the outer cover portion 26. In some embodiments, the inner surface 39 is curved or spherically shaped (e.g., hemi-spherical) and the outer cover portion 26 is also curved or spherically shaped (e.g., hemi-spherical) so that the two surfaces can be positioned adjacent to one another and move relative to one another. In a preferred embodiment, the inner surface 39 and the outer cover portion 26 have the same curvature and the inner surface 39 is configured to slide along the inside of the outer cover portion 26. Preferably, the inner surface 39 is coupled to the coupling portion 38 and extends upward from the coupling portion 38 and front portion 30.

Preferably, a portion of the inner surface 39 is visible through the window portion or opening 28 on the outer cover portion 26. In some embodiments, the window portion 28 comprises a translucent or transparent material that makes the underlying inner surface portion 39 visible. In other preferred embodiments, the window portion 28 is a void or opening in the outer cover portion 26 through which portions of the inner surface 39 are visible. Preferably, the inner surface 39 includes one or more visual features 40 that are visible through the window portion 28. As the inner surface 39 moves relative to the outer cover portion 26, the visual feature 40 moves relative to the window portion 28 which can provide a desired visual effect. For example, in a preferred embodiment, the inner surface 39 includes two visual features 40 that resemble eyes or the iris and pupil portions of an eye. The outer cover portion 26 includes two window portions 28, and one of the visual features 40 is visible through each of the window portions 28. The visual features 40 that resemble eyes can move side to side relative to the window portions 28 as the inner surface 39 moves relative to the outer cover portion 26. This results in a visual effect resembling eyes moving side to side as the handlebar assembly 32 rotates from side to side. This embodiment also results in the desired effect that the eyes or visual features 40 follow the direction of the handlebar assembly 32 and front portion 30 as a user steers the kart. Preferably, the visual features 40 move to point in the direction that the kart is moving or being steered. In alternative arrangements, a portion of or component connected to and movable with the inner surface portion 39 can extend to the outside of the cover 26, such as through openings (e.g., window portions 28) or from underneath of the cover 26, such that the exposed portion or component is visible and creates a desired visual effect upon steering or other movement of the kart. In other arrangements, the visual feature can be color(s) or symbols (e.g., words) that can move relative to another portion of the kart (e.g., the cover 26) and can be exposed or hidden as a result of steering or other movement of the kart, for example. Thus, for example, the exposed color could move or could change as a result of steering or other movement of the kart. Or, an exposed word(s) or other symbols could changes as a result of steering, such as the words "left" or "right" depending on the steering direction, which could be visible to a user of the kart, if desired.

Figure 4:
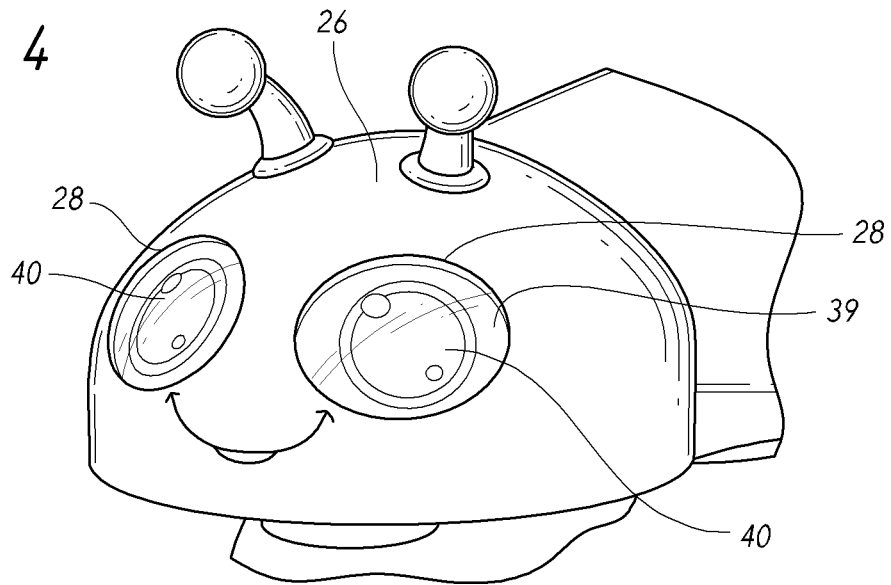
FIG. 4 illustrates an embodiment of the window portions and visual features of the kart of FIG. 1.

As illustrated in FIG. 4, in some embodiments the visual features 40 are substantially centered within the window portions 28 when the front portion 30 and handlebar assembly 32 are in a position pointing straight forward relative to the rear portion 20. Preferably the visual features 40 resemble eye portions and are centered within the window portions 28 when the front portion 30 is in a centered position relative to the rear portion 20 and not rotated to one side or the other.

Figure 5:
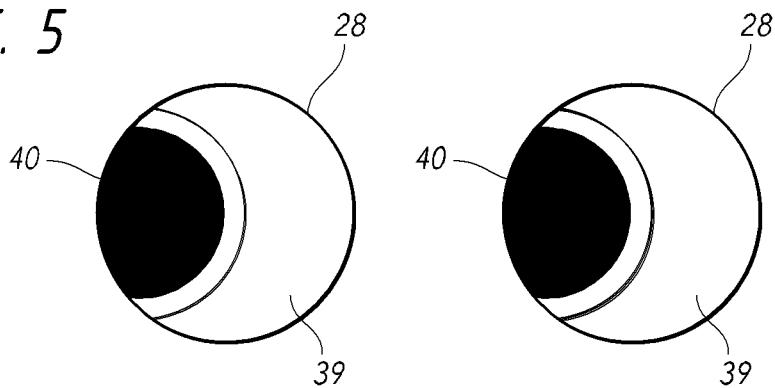
FIG. 5 illustrates the window portions and visual features of FIG. 4 in a different position.

As illustrated in FIG. 5, in some embodiments the visual features 40 move to the right side of the window portions 28 when the handlebar assembly 32 is rotated to the right relative to the rear portion and the inner surface 39 rotates to the right. Preferably, this provides the visual effect of the visual features 40, which resemble eyes, moving to the right as the handlebar assembly 32 is steered to the right.

Figure 6:
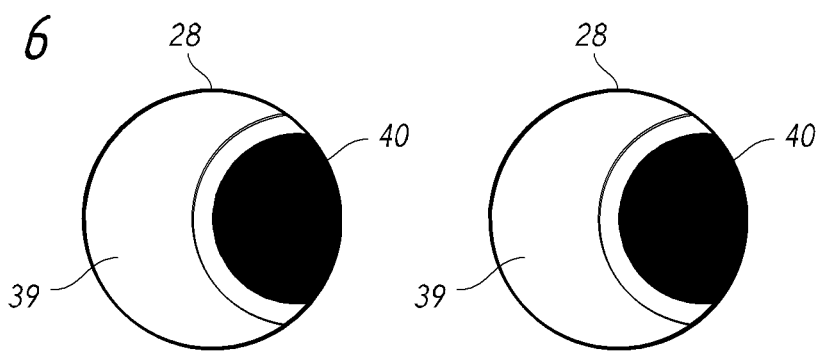
FIG. 6 illustrates an embodiment of the window portions and visual features of FIG. 4 in another different position.

As illustrated in FIG. 6, in some embodiments the visual features 40 move to the left side of the window portions 28 when the handlebar assembly 32 is rotated to the left relative to the rear portion and the inner surface 39 rotates to the left. Preferably, this provides the visual effect of the visual features 40, which resemble eyes, moving to the left as the handlebar assembly 32 is steered to the left. In other embodiments, the visual features 40 can move in an opposite direction relative to the direction of movement of the handlebar assembly 32 or front portion 30. In some embodiments, the movement of the visual features 40 relative to the window portions 28 can include a vertical component.

Although the embodiments of the invention presented herein have been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A kart comprising:
   a body having a front portion and a rear portion, the front portion rotatably connected to the rear portion and having an inner surface, the rear portion having a seat and an outer shell;
   at least one rear wheel connected to the rear portion and configured to rotate about a swivel axis;
   at least one front wheel connected to the front portion;
   wherein the inner surface is positioned adjacent to the outer shell and the outer shell covers at least a portion of the inner surface;

wherein the outer shell includes at least one opening through which a portion of the inner surface is visible;

wherein the inner surface includes at least one visual feature visible through the at least one opening, and the visual feature moves relative to the opening as the front portion rotates relative to the rear portion.

2. The kart of claim 1, wherein the front portion rotates relative to the rear portion about an axis, and the inner surface rotates relative to the outer portion about the axis.

3. The kart of claim 1, wherein the outer shell includes two openings and the inner surface includes two visual features, and the two visual features resemble eyes.

4. The kart of claim 3, wherein the two visual features move relative to the openings along a curved path as the front portion rotates relative to the rear portion.

5. The kart of claim 1, further comprising a handlebar assembly connected to the front portion, the handlebar assembly including substantially straight portions configured to support the foot of a user riding the kart.

6. The kart of claim 1, wherein the outer shell is curved and the inner surface is similarly curved so that the inner surface can slide along the inside of the outer shell.

7. The kart of claim 1, wherein the at least one front wheel is positioned underneath the rear portion.

8. A ridable vehicle comprising:
a body having a rear portion moveably connected to a front portion, the rear portion having an outer shell with at least one opening and the front portion having an inner surface adjacent to the outer shell, a visual feature on the inner surface visible through the opening in the outer shell;
at least one front wheel connected to the front portion and at least one rear wheel connected to the rear portion;
a handlebar assembly coupled to the front portion and accessible to a user riding the vehicle;
wherein the inner surface moves relative to the outer shell when the front portion moves relative to the rear portion;
wherein the visual feature moves relative to the opening.

9. The ridable vehicle of claim 8, wherein the front portion comprises a coupling portion and the rear portion comprises a seat.

10. The ridable vehicle of claim 8, wherein the front portion rotates relative to the rear portion about an axis, and the inner surface rotates relative to the outer shell about the axis.

11. The ridable vehicle of claim 8, wherein the outer shell portion includes two openings and the inner surface includes two visual features, and the two visual features resemble eyes.

12. The ridable vehicle of claim 11, wherein the two visual features move relative to the two openings along a curved path.

13. The ridable vehicle of claim 8, wherein the handlebar assembly includes substantially straight portions configured to support the foot of a user riding the kart.

14. A ridable vehicle comprising:
a rear body portion comprising:
an outer shell comprising an opening; and
a rear wheel;
a front body portion pivotably connected with the rear body portion, the front body portion comprising:
a steering assembly configured to enable a user to steer the vehicle;
a front wheel; and
an inner shell that is at least partially received in the outer shell of the rear body portion, the inner shell comprising a visual feature that resembles a facial feature of a character, the visual feature being aligned with the opening so as to be at least partially visible through the opening in the outer shell;
the inner shell and the steering assembly being connected such that rotation of the steering assembly from side to side correspondingly rotates the inner shell from side to side relative to the outer shell, thereby providing a visual effect of the visual feature of the inner shell moving from side to side relative to the opening in the outer shell.

15. The vehicle of claim 14, wherein the vehicle is configured such that the visual features follows the direction of the steering assembly as the user steers the vehicle.

16. The vehicle of claim 14, wherein the vehicle is configured such that the visual features moves to point in the direction that the vehicle is moving or being steered.

17. The vehicle of claim 14, wherein, when the steering assembly is in a position pointing straight forward relative to the rear portion, the visual feature is substantially centered within the opening.

18. The vehicle of claim 14, wherein the outer shell comprises a plurality of openings and the inner shell comprises a plurality of visual features, each of the visual features being configured to align with one of the openings.

19. The vehicle of claim 14, wherein the visual feature resembles an eye.

20. The vehicle of claim 14, wherein the steering assembly comprises a handlebar assembly.

* * * * *